United States Patent [19]

Yamamoto et al.

[11] Patent Number: 5,795,677
[45] Date of Patent: Aug. 18, 1998

[54] NON-AQUEOUS ELECTROLYTE AND LITHIUM SECONDARY BATTERY

[75] Inventors: Taketsugu Yamamoto; Hitoshi Miura, both of Ibaraki, Japan

[73] Assignee: Sumitomo Chemical Company, Limited, Osaka, Japan

[21] Appl. No.: 685,666

[22] Filed: Jul. 24, 1996

[30] Foreign Application Priority Data

Jul. 25, 1995 [JP] Japan ................................. 7-189335

[51] Int. Cl.$^6$ .................................................. H01M 6/14
[52] U.S. Cl. ........................ 429/194; 429/197; 429/199
[58] Field of Search ............................ 429/194, 197, 429/199

[56] References Cited

U.S. PATENT DOCUMENTS 5,529,859  6/1996  Shu et al. ............................ 429/199

FOREIGN PATENT DOCUMENTS

0599534A1  6/1994  European Pat. Off. .
0634805A1  1/1995  European Pat. Off. .

OTHER PUBLICATIONS

Patent Abstracts of Japan, JP1117838, vol. 13, No. 339, May 10, 1989.
Patent Abstracts of Japan, JP62029070, vol. 11, No. 204, Feb. 7, 1987.
Patent Abstracts of Japan, JP61061369, vol. 10, No. 224, Mar. 29, 1986.
Patent Abstracts of Japan, JP2207464, vol. 14, No. 502, Aug. 17, 1990.

*Primary Examiner*—Bruce F. Bell
*Attorney, Agent, or Firm*—Sughrue, Mion, Zinn, Macpeak & Seas, PLLC

[57] ABSTRACT

The present invention provides a non-aqueous electrolyte that includes a non-aqueous solvent and a lithium salt. The non-aqueous electrolyte contains a halogen-substituted ether compound represented by the general formula (I):

$$R_1 - O - R_2 \qquad (I)$$

wherein $R_1$ is an alkyl or halogen-substituted alkyl group having 2 or less carbon atoms and $R_2$ is a halogen-substituted alkyl group having 2 to 10 carbon atoms. Additionally, the non-aqueous electrolyte contains at least one compound that is capable of dissolving the lithium salt in an amount of not less than 0.5 mol/liter. When this compound is added to the halogen-substituted ether compound, a mixed solvent is formed that is used as the non-aqueous solvent. The present invention also provides a lithium secondary battery that comprises a cathode that can be doped/undoped with lithium ions, an anode of a lithium metal or alloy or an anode that can be doped/undoped with lithium ions, and the non-aqueous electrolyte described above. A lithium secondary battery that uses the non-aqueous electrolyte of the present invention is superior in cycle life, in repeating charging/discharging and low-temperature capacity, is particularly superior in high-rate capacity, and causes little deterioration of high-rate capacity due to cycles.

22 Claims, No Drawings

NON-AQUEOUS ELECTROLYTE AND LITHIUM SECONDARY BATTERY

FIELD OF THE INVENTION

The present invention relates to a non-aqueous electrolyte, and a lithium secondary battery using the same.

BACKGROUND OF THE INVENTION

Recently, portable information apparatuses including lap-top computers, portable telephones, personal digital assistants, etc. have come into wide use. These apparatuses for multimedia provide many functions. Therefore, they need portable and light-weight batteries having a large capacity and a high energy density for their power sources.

One method for accomplishing a high energy density of a battery is to increase the voltage of the battery. A lithium secondary battery attaining an average voltage of 3.6 V can be obtained by using a lithiated transition metal dioxide(e.g. lithiated nickel dioxide, lithiated cobalt dioxide, etc.) as an active material for a cathode and a carbonaceous material that can be doped/undoped with lithium ions as an active material for an anode.

The active material stated above has a very high electro-chemical activity, and is reactive on the electrolyte. The lithiated metal dioxide such as lithiated cobalt dioxide, lithiated nickel dioxide, etc. has a high redox potential when lithium is charged/discharged. That is, it has a strong oxidation power. Therefore, stability against oxidation is requested for the electrolyte.

The carbonaceous material that can be doped/undoped with lithium ions has a low redox potential when lithium is charged/discharged. In other words, it has a strong reduction power. Therefore, reduction resistance is requested for the electrolyte.

Since the redox potential for charging/discharging lithium in the above carbonaceous material is lower than that of hydrogen, water or a protic solvent can not be used as the solvent for electrolyte. Therefore, an aprotic solvent is used. In the case where the electrolyte used is water, the conductivity reaches about 1 S/cm. However, when the aprotic solvent is used, the conductivity is several tens mS/cm at most. A large problem exists if the internal resistance of the lithium battery that becomes large.

The latest electronic apparatuses such as lap-top computers, cam-corders, portable telephones, etc. frequently have been used outside as a portable. Therefore, batteries for the apparatuses are required to operate over a wide temperature range. At the same time, batteries are required to be able to pulse discharge at a high rate because of the digitization of these electronic appratuses. Under these circumstances, the lithium secondary battery was not sufficient in a high-rate capacity and a low-temperature capacity, necessarily, in comparison with a battery using an aqueous electrolyte.

An object of the present invention is to provide a non-aqueous electrolyte which has and improved cycle life for repeating charging/discharging and low-temperature capacity, is particularly superior in a high-rate capacity, and causes little deterioration of a high-rate capacity due to cycles, and a lithium secondary battery using the same.

SUMMARY OF THE INVENTION

The present inventors have intensively studied to solve the problems mentioned above. As a result, it has been found that the above problems can be solved by using a specific halogen-substituted ether as an organic solvent of a non-aqueous electrolyte, and the present invention has been accomplished.

That is, the present invention relates to the following:

(1) A non-aqueous electrolyte comprising a non-aqueous solvent and a lithium salt, said non-aqueous solvent containing a halogen-substituted ether compound represented by the general formula [I]:

$R_1$—O—$R_2$                 [I]

wherein $R_1$ is an alkyl or halogen-substituted alkyl group having 2 or less carbon atoms and $R_2$ is a halogen-substituted alkyl group having 2 to 10 carbon atoms) and at least one sort of a compound, in which a mixed solvent as the non-aqueous solvent obtained by adding the compound to the halogen-substituted ether compound is capable of dissolving the lithium salt in an amount of not less than 0.5 mol/l; and (2) A lithium secondary battery comprising a cathode that can be doped/undoped with lithium ions, an anode of a lithium metal, a lithium alloy or a material that can be doped/undoped with lithium ions, and a non-aqueous electrolyte described in the above-mentioned paragraph (1).

DETAILED DESCRIPTION OF THE INVENTION

The present invention will be explained in detail, hereinafter.

The non-aqueous electrolyte of the present invention comprises a halogen-substituted ether compound represented by the general formula [I] as a non-aqueous solvent, and a lithium salt.

With the halogen-substituted ether compound, R1 in the formula is an alkyl or halogen-substituted alkyl group having 2 or less carbon atoms and is preferably a methyl group. When the number of carbon atoms of R1 exceeds 2, the solubility of the lithium salt in the ether compound becomes low, and this is not preferred. R2 in the formula is a halogen-substituted alkyl group having 2 to 10 carbon atoms, preferably 3 to 5 carbon atoms. When the number of carbon atoms of R2 exceeds 10, the viscosity of the ether compound becomes large, and this is not preferred.

It is preferred that the ether compound shows a low vapor pressure within the operating temperature range of the battery. Then R2 in the formula is preferably a halogen-substituted alkyl group having 2 or more carbon atoms, and more preferably a halogen-substituted alkyl group having 3 or more carbon atoms, because the molecular weight or polarity becomes large.

Examples of R2 in the general formula [I] include the groups shown in the formulae[III]–[X].

$CF_3$—$(CF_2)_n$—$CH_2$—                 [III]

(n is integer of 1,2,3,4 or 5)

$HCF_2$—$(CF_2)_n$—$CH_2$—                 [IV]

(n is integer of 1,2,3,4 or 5)

$CF_3$—$(CF_2)_m$—CHF—$(CF_2)_n$—$CH_2$—        [V]

(m and n are each independently integer of 0,1,2,3 or 4; m+n≦0)

$HCF_2-(CF_2)_m-CHF-(CF_2)_n-CH_2-$ [VI]

(m and n are each independently integer of 0,1,2,3 or 4; $m+n \leq 0$)

$(CF_a)_2-CF-(CF_2)_n-CH_2-$ [VII]

(n is integer of 0,1,2,3 or 4)

$(HCF_2)_2-CF-(CF_2)_n-CH_2-$ [VIII]

(n is integer of 0,1,2,3 or 4)

$CF_3-CF_2-C(CF_a)F-(CF_2)_n-CH_2-$ [IX]

(n is integer of 0,1 or 2)

$HCF_2-CF_2-C(CF_3)F-(CF_2)_n-CH_2-$ [X]

(n is integer of 0,1 or 2)

Halogen-substituted ether compounds having the R2 groups above are preferred because of their good high-rate property due to cycles.

Specific examples of the halgen-substituted ether compounds include 3,3,3,2,2-pentafluoropropyl methyl ether, 3,3,3,2,2-pentafluoropropyl fluoromethyl ether, 3,3,3,2,2-pentafluoropropyl difluoromethyl ether, 3,3,3,2,2-pentafluoropropyl trifluoromethyl ether, 3,3,3,2,2-pentafluoropropyl ethyl ether, 3,3,3,2,2-pentafluoropropyl 2,2,2-trifluoroethyl ether, 4,4,4,3,3,2,2-heptafluorobutyl methyl ether, 4,4,4,3,3,2,2-heptafluorobutyl fluoromethyl ether, 4,4,4,3,3,2,2-heptafluorobutyl difluoromethyl ether, 4,4,4,3,3,2,2-heptafluorobutyl trifluoromethyl ether, 4,4,4,3,3,2,2-heptafluorobutyl ethyl ether, 4,4,4,3,3,2,2-he ptafluorobutyl 2,2,2-trifluoroethyl ether, 5,5,5,4,4,3,3,2,2-nonafluoropentyl methyl ether, 5,5,5,4,4,3,3,2,2-nonafluoro pentyl fluoromethyl ether, 5,5,5,4,4,3,3,2,2-nonafluoropenty l difluoromethyl ether, 5,5,5,4,4,3,3,2,2-nonafluoropentyl trifluoromethyl ether, 5,5,5,4,4,3,3,2,2-nonafluoropentyl ethyl ether, 5,5,5,4,4,3,3,2,2-nonafluoropentyl 2,2,2-trifluoroethyl ether, 3,3,2,2-tetrafluoropropyl methyl ether, 3,3,2,2-tetrafluoropropyl fluoromethyl ether, 3,3,2,2-tetrafluoropropyl difluoromethyl ether, 3,3,2,2-tetrafluoropropyl trifluoromethyl ether, 3,3,2,2-tetrafluoropropyl ethyl ether, 3,3,2,,2-tetrafluoropropyl 2,2,2-trifluoroethyl ether 4,4,3,3,2,2-hexafluorobutyl methyl ether, 4,4,3,3,2,2-hexafl uorobutyl fluoromethyl ether, 4,4,3,3,2,2-hexafluorobutyl difluoromethyl ether, 4,4,3,3,2,2-hexafluorobutyl trifluoromethyl ether, 4,4,3,3,2,2-hexafluorobutyl ethyl ether, 4,4,3,3,2,2-hexafluorobutyl 2,2,2-trifluoroethyl ether 5,5,4,4,3,3,2,2-octaafluoropentyl methyl ether, 5,5,4,4,3,3,2,2-octaafluoropentyl fluoromethyl ether, 5,5,4,4,3,3,2,2-octaafluoropentyl difluoromethyl ether, 5,5,4,4,3,3,2,2-octaafluoropentyl trifluoromethyl ether, 5,5,4,4,3,3,2,2-octaafluoropentyl ethyl ether, 5,5,4,4,3,3,2,2-octaafluoropentyl 2,2,2-trifluoroethyl ether, 3,3,3,2-tetrafluoro-2-trifluoromethylpropyl methyl ether, 3,3,3,2-tetrafluoro-2-trifluoromethylpropyl fluoromethyl ether, 3,3,3,2-tetrafluoro-2-trifluoromethylpropyl difluoromethyl ether, 3,3,3,2-tetrafluoro-2-trifluoromethylp ropyl trifluoromethyl ether, 3,3,3,2-tetrafluoro-2-trifluoro methylpropyl ethyl ether, 3,3,3,2-tetrafluoro-2-trifluoromet hylpropyl 2,2,2-trifluoroethyl ether, 4,4,4,3,2,2-hexafluoro-3-trifluoromethylbutyl methyl ether, 4,4,4,3,2,2-hexafluoro-3-trifluoromethylbutyl fluoromethyl ether, 4,4,4,3,2,2-hexa fluoro-3-trifluoromethylbutyl difluoromethyl ether, 4,4,4,3,2,2-hexafluoro-3-trifluoromethylbutyl trifluoromethyl ether, 4,4,4,3,2,2-hexafluoro-3-trifluoromet hylbutyl ethyl ether, 4,4,4,3,2,2-hexafluoro-3-trifluorometh ylbutyl-2,2,2-trifluoroethyl ether, 3,3,3,2-tetrafluoropropyl methyl ether, 3,3,3,2-tetrafluoropropyl fluoromethyl ether, 3,3,3,2-tetrafluoropropyl difluoromethyl ether, 3,3,3,2-tetrafluoropropyl trifluoromethyl ether, 3,3,3,2-tetrafluoropropyl ethyl ether, 3,3,3,2-tetrafluoropropyl 2,2,2-trifluoroethyl ether, 4,4,4,3,2,2-hexafluorobutyl methyl ether, 4,4,4,3,2,2-hexafl uorobutyl fluoromethyl ether , 4,4,4,3,2,2-hexafluorobutyl difluoromethyl ether, 4,4,4,3,2,2-hexafluorobutyl trifluoromethyl ether, 4,4,4,3,2,2-hexafluorobutyl ethyl ether, 4,4,4,3,2,2-hexafluorobutyl 2,2,2-trifluoroethyl ether, 5,5,5,4,3,3,2,2-octafluoropentyl methyl ether, 5,5,5,4,3,3,2,2-octafluoropentyl fluoromethyl ether, 5,5,5,4,3,3,2,2-octafluoropentyl difluoromethyl ether, 5,5,5,4,3,3,2,2-octafluoropentyl trifluoromethyl ether, 5,5,5,4,3,3,2,2-octafluoropentyl ethyl ether, 5,5,5,4,3,3,2,2-octafluoropentyl 2,2,2-trifluoroethyl ether 3,3,2-trifluoropropyl methyl ether, 3,3,2-trifluoropropyl fluoromethyl ether, 3,3,2-trifluoropropyl difluoromethyl ether, 3,3,2-trifluoropropyl trifluoromethyl ether, 3,3,2-trifluoropropyl ethyl ether, 3,3,2-trifluoropropyl 2,2,2,-trifluoroethyl ether, 4,4,3,2,2-pentafluorobutyl methyl ether, 4,4,3,2,2-pentafluorobutyl fluoromethyl ether, 4,4,3,2,2-pentafluorobutyl difluoromethyl ether, 4,4,3,2,2-pentafluorobutyl trifluoromethyl ether, 4,4,3,2,2-pentafluorobutyl ethyl ether, 4,4,3,2,2-pentafluorobutyl 2,2,2-trifluoroethyl ether, 5,5,4,3,3,2,2-heptafluoropentyl methyl ether, 5,5,4,3,3,2,2-heptafluoropentyl fluoromethyl ether, 5,5,4,3,3,2,2-heptafluoropentyl difluoromethyl ether, 5,5,4,3,3,2,2-heptafluoropentyl trifluoromethyl ether, 5,5,4,3,3,2,2-heptafluoropentyl ethyl ether, 5,5,4,3,3,2,2-h eptafluoropentyl 2,2,2-trifluoroethyl ether.

The content of the fluorine-substituted ether compound in the mixed solvent is preferably from 5 to 90% by volume, and more preferably from 20 to 70% by volume. When the content of the fluorine-substituted ether compound is less then 5% by volume or greater then 90% by volume, the high-rate capacity is deteriorated.

It becomes essential for the fluorine-substituted ether compound represented by general formula [I] to add a compound having a high solubility of a lithium salt because of the low solubility of the lithium salt in the ether compound. In practical use, it is preferred that the electrolyte has a salt concentration of not less than 0.5 mol/liter. A compound is added to the halogen-substituted ether compound to obtain a mixed solvent which is capable of dissolving the lithium salt in an amount of not less than 0.5 mol/liter.

Among the compounds added, a carbonate compound is particularly preferred because the reactivity between the carbonate compound and active material of the battery is low.

Examples of the carbonate compound include acyclic carbonates such as dimethyl carbonate, diethyl carbonate, ethyl methyl carbonate, methyl propyl carbonate, isopropyl methyl carbonate, ethyl propyl carbonate, isobutyl methyl carbonate, etc; and cyclic carbonate such as ethylene carbonate (1,3-dioxolane-2-one), vinylene carbonate (1,3-dioxolane-2-one), propylene carbonate (4-methyl-1,3-dio xolane-2-one), 1,2-butylene carbonate (4-ethyl-1,3-dioxolane-2-one), 2,3-butylene carbonate (4,5-dimethyl-1,3-dioxolane-2-one), isobutylene carbonate (4,4-dimethyl-1,3-dioxolane-2-one), etc. These carbonate compounds may be used alone, or 2 or more of them may be optionally used in combination.

Using the mixed solvent with the acyclic carbonate such as dimethyl carbonate, diethyl carbonate, etc., it is preferred because the resultant electrolyte has excellent high-rate properties. A mixed solvent with dimethyl carbonate is particularly preferred. It has hitherto been..considered that the presence of cyclic carbonates such as propylene carbonate, ethylene carbonate, etc. is essential for maintaining cycle properties when using a carbonaceous material that can be doped/undoped with lithium ions as an active material for an anode. However, it has been found that excellent cycle properties can be maintained without containing these cyclic carbonates when using the electrolyte of the present invention.

When cyclic carbonates such as ethylene carbonate, vinylene carbonate, etc. are added to the above solvent, the initial discharge capacity is improved. When using a graphite material as an anode-active substance, ethylene carbonate is particularly preferred. Since the high-rate, capacity and low-temperature capacity are deteriorated as the content of these cyclic carbonates becomes large, the content of the cyclic carbonate is preferably not more than 50% by volume, more preferably not more than 30% by volume.

As the lithium salt in the non-aqueous electrolyte of the present invention, any one which has hitherto been known can be used, and examples thereof include $LiAsF_6$, $LiPF_6$, $LiBF_4$, $LiClO_4$ and $LiCF_3SO_3$. Among them, $LiPF_6$ is preferred because the ionic conductivity of the resultant non-aqueous electrolyte is large. In the non-aqueous electrolyte of the present invention, the lithium salt concentration is preferably from 0.5 to 2 mol/liter, and more preferably from 0.7 to 1.5 mol/liter because of large ionic conductivity.

In the non-aqueous electrolyte of the present invention, it is preferred that the water content in the solvent before dissolving the electrolyte is not more than 1000 ppm because the capacity and cycle life of the battery are good when using it for the lithium battery.

The lithium secondary battery comprises a cathode that can be doped/undoped with lithium ions, an anode of a lithium metal or alloy or an anode that can be doped/undoped with lithium ions, and the above non-aqueous electrolyte. In the lithium secondary battery of the present invention, it is preferred to use a lithiated metal dioxide containing at least one lithiated transition metal dioxide as an active material for the cathode because the charge voltage is high and the energy density of the battery can be increased.

Examples of the lithiated metal dioxide containing at least one transition metal in the cathode include a lithiated metal dioxide containing at least one transition metal such as vanadium, manganese, iron, cobalt, nickel, etc. Among them, a laminar lithiated metal dioxide containing cobalt, nickel, etc. having an $\alpha$-$NaFeO_2$ type structure or a lithiated metal dioxide comprising manganese, etc. having a spinel type structure are particularly preferred because the average discharge potential is high. Among them, the laminar lithiated metal dioxide (e.g., lithiated nickel dioxide) is particularly preferred because of the excellent cycle life.

Since the cathode in the lithium secondary battery uses the non-aqueous electrolyte of the present invention, a lithiated metal dioxide containing at least one transition metal is used as the active material. Specific examples of the cathode include those obtained by uniformly mixing the active material powder of the lithiated metal dioxide and the auxiliary conductive material powder with a binder for binding these powders, followed by pressure molding, or for those obtained by forming these powders into a paste using a solvent, applying the paste on a current collector sheet, followed by drying and further pressing to stick on the collector sheet.

The auxiliary conductive material powder used for the cathode may be those which have a conductive effect, a resistance to the non-aqueous electrolyte used, and a resistance to the electrochemical reaction at the cathode. Examples thereof include graphite powder, carbon black, coke powder, conductive polymer, etc.

The amount of the auxiliary conductive material is preferably about 1 to 20 parts by weight based on 100 parts by weight of the active substance powder used.

In the lithium secondary battery of the present invention, the active material of the anode may comprise natural or artificial graphite or a coke material as a single ingredient or a main ingredient because of the good charge/discharge cycle characteristics. It is also possible to use a lithium metal or alloy as the active material for an anode.

When natural or artificial graphite or a coke material is used as the active material for an anode, the anode can contain a polymer having a carbonate structure represented by the general formula [II] and a number average molecular weight of 300 or more

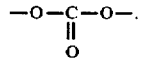
[II]

The binder used for the cathode or anode may be those which have a binding effect, a resistance to the non-aqueous electrolyte used and a resistance to the electrochemical reaction at the cathode or anode. Examples thereof include fluororesins such as polytetrafluoroethylene (hereinafter referred to as "PTFE"), polyvinylidene fluoride (hereinafter referred to as "PVdF"), etc., and polyethylene polypropylene.

The amount of the binder is preferably about 1 to 20 parts by weight based on 100 parts by weight of the active substance powder used.

The current collector used for the above cathode or anode may be those which have a resistance to the non-aqueous electrolyte used and a resistance to the electrochemical reaction at the cathode or anode. Examples thereof include nickel, titanium, stainless steel, aluminum, copper etc.

It is preferred that the thickness of the current collector is as small as possible and still maintain the strength, because the volume energy density of the battery increases. The thickness is preferably about 5 to 100 µm.

As the current collector of the cathode, an aluminum foil is preferred because it is easily formed into a thin film and is cheap. As the current collector of the anode, a copper foil is preferred because it rarely forms an alloy with lithium and is easily formed into a thin film.

In the lithium secondary battery using the non-aqueous electrolyte of the present invention, the separator may be those which prevent contact between both electrodes, have insulating properties, which retain the non-aqueous electrolyte, have a function capable of penetrating lithium ions, a resistance to the non-aqueous electrolyte used, and a resistance to the electrochemical reaction at the cathode or anode. Examples thereof include nonwoven and woven fabrics of olefin resins (e.g. fluororesins, polyethylene, polypropylene, etc.) and nylon.

It is preferred that the thickness of the separator is as small as possible so far as the specific energy density of the battery increases and internal resistance decreases. The thickness is preferably about 10 to 200 µm.

EXAMPLE

The following Examples further illustrate the present invention in detail but are not to be construed to limit the scope thereof.

(1) Specification of lithium secondary battery tested: The cathode of the lithium secondary battery tested was obtained by method described hereinafter.

As a cathode active material, powder of lithiated nickel dioxide containing gallium was prepared by mixing lithium nitrate, nickel carbonate and gallium nitrate and firing the mixture in an oxygen stream at 660° C. for 15 hours. To 87% by weight of the cathode active material powder, 1% by weight of acetylene black having a number average primary particle size of 40 nm (manufactured by Denki Kagaku Kogyo Kabushiki Kaisha, trade name: Denka black, 50% pressed product) and 9% by weight of scaly artificial graphite having a weight average particle size of 7.2 μm [manufactured by Ronza Co., trade name: KS15], 3% by weight of PVdF [manufactured by Kureha Chemical Industry Co., Ltd., trade name: KF#1300] in N-methylpyrrolidone as a solvent was added as a binder, followed by sufficient kneading to form a paste.

It was confirmed by X-ray powder diffraction that the above lithiated nickel dioxide has an α-NaFeO2 type structure.

After the paste was coated on an aluminum foil having a thickness of 20 μm as the current collector, the coated foil was dried and pressed to form a sheet, which was cut into small pieces the size of 1.3×1.8 cm to obtain cathodes. The weight of active material of each of these cathodes is from 40 to 45 mg.

The anode of the lithium secondary battery tested was obtained by the method described hereinafter.

The carbon powder for the anode was obtained using natural graphite powder, pseudo-graphitic carbon black powder, and silane coupling agent, by the method described hereinafter. The natural graphite powder used occurred in Madagascar, which was heat-treated at 3000° C., and has a specific surface area of 9 m$^2$/g according to a nitrogen adsorption method, a number-average particle size of 10 μm, a true density of 2.26, an interlayter spacing d002 of 3.36 angstrom in X-ray powder diffraction and an ash content of 0.05% by weight: The pseudographite carbon black powder [manufactured by Tokai Carbon Co., Ltd., trade name: TB3800], which was graphitized at 2800° C., and has a specific surface area of 30 m2/g according to a nitrogen adsorption method, a true specific gravity of 2.04 and a number average primary particle size of 66 nm. To 95 parts by weight of the natural graphite powder, 5 parts by weight of the pseudo-graphitic carbon black powder was added and mixed to obtain a mixed carbonaceous material. To the mixed carbonaceous material, 1 part by weight of a solution prepared by previously dispersing silane coupling agent [manufactured by Nippon Yunicar Co., Ltd., trade name: A186] which was previously dispersed in pure water was added, followed by sufficient mixing and further vacuum-drying at 150° C. to obtain carbon powder treated with the silane coupling agent.

Then, 10% by weight of PVdF in N-methylpyrrolidone as a binder was added to 90% by weight of the above silane coupling agent-treated carbon powder, as a solvent, followed by sufficient kneading to form a paste. After the paste was coated on a copper foil having a thickness of 20 μm as the current collector, the foil was dried and pressed to form into a sheet, which was cut into small pieces the size of 1.5×2 cm to obtain anodes. As the separator, a micro-porous polypropylene film [manufactured by Daisel Chemical Industries, Ltd., trade name: CELLGUARD #2400] was used.

(II) Cycle property test condition

With the cycle efficiency of the discharge capacity of the battery, the following conditions (1) and (2) were alternatively repeated four times and, finally, the condition (1) (one time) and only first cycle of the condition (2) were conducted, that is, a total of 91 times of the charge/discharge cycles were repeated, and then the cycle efficiency and high rate efficiency were examined.

(1) A constant-current and voltage charging was conducted under the condition of a current of 7.7 mA, a charge maximum voltage of 4.24 V and a charge time of 3 hours, and then discharging was conducted under the condition of a current of 1.54 mA and a final voltage of 2.75 V. This charging/discharging is conducted consecutively two times (referred to as a low-current discharge condition).

(2) A constant current and voltage charging was conducted under the condition of a charge current of 7.7 mA, a charge maximum voltage of 4.24 V and a charge time of one hour, and then discharging was conducted under the condition of a discharge current of 7.7 mA and a final voltage of 2.75 V. This cycle was conducted consecutively 20 times (referred to as a large-current discharge condition). The cycle efficiency is evaluated by a capacity retention of a discharge capacity in the 90th charging/discharging to that in the second charging/discharging. The higher the cycle efficiency, the longer the cycle life.

The high rate efficiency is evaluated by a capacity retention of the first discharge capacity under the large current discharge condition to the second discharge capacity under the low current discharge condition. The initial high rate efficiency corresponds to the proportion of the discharge capacity of the third cycle to that of the second cycle, and the high rate efficiency after cycles corresponds to the proportion of the discharge capacity of the 91st cycle to that of the 90th cycle.

Example 1

Using a non-aqueous electrolyte prepared by dissolving LiPF$_6$ as the lithium salt in a mixed solvent of pentafluoropropyl methyl ether (hereinafter referred to as "PFPME") and dimethyl carbonate (hereinafter referred to as "DMC") (volume ratio: 1:1) as a solvent for non-aqueous electrolyte to 1 mol/liter. The above cathode and anode were sandwiched with a separator. The non-aqueous electrolyte and the sandwiched electrodes with the separator were put in a container made of stainless steel to produce a battery A1.

The observed results of the cycle efficiency and high rate efficiency are shown in Table 1.

Example 2

According to the same manner as that described in Example 1 except for using a mixed solvent of ethylene carbonate (hereinafter referred to as "EC"), DMC and PFPME (volume ratio: 10:45:45 and 30:35:35) as a solvent for non-aqueous electrolyte, batteries A2 and A3 were produced, respectively. The charge/discharge test was conducted according to the same manner as that described in Example 1.

The observed results of the cycle efficiency and high rate efficiency are shown in Table 1.

Comparative Example 1

According to the same manner as that described in Example 1 except for using only DMC, a mixed solvent of DMC and ethyl methyl carbonate (hereinafter referred to as "EMC") (volume ratio: 50:50) and a mixed solvent of DMC, EC and EMC (volume ratio: 30:35:35) as the solvent for non-aqueous electrolyte, batteries R1, R2 and R3 were produced, respectively. The charge/discharge test was conducted according to the same manner as that described in Example 1.

The observed results of the cycle efficiency and high rate efficiency are shown in Table 1.

TABLE 1

|  | Battery | Composition of solvent | Initial discharge capacity | Cycle efficiency | High-rate efficiency Initial | High-rate efficiency After cycles |
|---|---|---|---|---|---|---|
| Example 1 | A1 | DMC:PFPME = 50:50 | 6.3 | 0.84 | 0.74 | 0.80 |
| Example 2 | A2 | EC:DMC:PFPME = 10:45:45 | 7.3 | 0.84 | 0.74 | 0.80 |
|  | A3 | EC:DMC:PFPME = 30:35:35 | 7.5 | 0.80 | 0.63 | 0.56 |
| Comparative Example 1 | R1 | DMC |  | 0.79 | 0.68 | 0.50 |
|  | R2 | DMC:EMC = 50:50 |  | 0.78 | 0.47 | 0.33 |
|  | R3 | EC:DMC:EMC = 30:35:35 |  | 0.77 | 0.63 | 0.57 |

As is apparent from Table 1, the battery A1 of the present invention is superior to the batteries R1, R2 and R3, which contain no PFPME, in cycle efficiencies, and are particularly superior in high rate efficiencies. Remarkably, the high rate efficiencies of the batteries R1 and R2, which contain no PFPME, are drastically deteriorated when the charge/discharge cycles are repeated, whereas no deterioration is recognized in the high-rate efficiencies of the battery of the present invention even if charge/discharge cycles are repeated. Therefore, the battery of the present invention is remarkably superior in cycle efficiencies of the high rate efficiencies.

Furthermore, surprisingly, the batteries A2 and A3, of the present invention, which contain EC, are remarkably superior in cycle efficiency to the battery R3, which has hitherto been suggested, using a mixed non-aqueous electrolyte of a cyclic carbonate and an acyclic carbonate.

The batteries A2 and A3, of the present invention which contain EC, were improved in initial discharge capacity in comparison with the battery A1 containing no EC. However, the high rate efficiencies were slightly deteriorated with respect to the battery A3 having a EC content of 30% by volume. That is, it has been found that the EC content is preferably 30% by volume at most.

Example 3

With the battery A2 obtained in Example 2, constant current and voltage charging was conducted at 20° C. under the condition of a current of 7.7 mA, a charge maximum voltage of 4.24 V and a charge time of 3 hours, and then discharging was conducted at −20° C. under the condition of a current of 1.54 mA, and a final voltage of 2.75 V. The low-temperature efficiencies were evaluated by the proportion of the discharge capacity on low-temperature discharging to that on room temperature discharging.

The resultant low-temperature efficencies are shown in Table 2.

Comparative Example 2

According to the same manner as that described in Example 3, the low-temperature efficencies of the batteries R1 and R2 produced in Comparative Example 1 were measured. The resultant low-temperature efficencies are shown in Table 2.

TABLE 2

| Test | Battery | Composition of solvent | Low-temperature efficiency |
|---|---|---|---|
| Example 3 | A2 | EC:DMC:PFPME = 10:45:45 | 73% |
| Comparative Example 2 | R1 | DMC | Impossible to discharge because of solidification |
|  | R2 | DMC:EMC = 50:50 | 20% |

As is apparent from Table 2, the battery A2 of the present invention shows excellent low-temperature efficencies in comparison with the battery A2 containing no PFPME.

Example 4

With the batteries A2 and A3 obtained in Example 2, constant current and voltage charging were conducted at 20° C. under the condition of a current of 7.7 mA, a charge maximum voltage of 4.24 V and a charge time of 3 hours and, after discharging at 60° C. under the condition of a current of 1.54 mA and a final voltage of 2.75 V, the charge/discharge test was conducted again at room temperature. As a result, it was possible to conduct charging/discharging.

Example 5

The flash points of the electrolytes obtained in Example 1 and 2 were measured according to a test method by tag closed tester. The results obtained are shown in Table 3.

The flash point of the electrolyte obtained in Comparative Example 1 was measured according to the test method by tag closed tester. The results obtained are shown in Table 3.

|  | Composition of electrolyte | | Flash point |
|---|---|---|---|
| Elecrolyte | Salt | Solvent | (°C.) |
| EA1 | 1M LiPF$_6$ | EC:DMC:PFPME = 10:45:45 | >46 |
| ER1 | 1M LiPF$_6$ | EC:DMC:PFPME = 30:35:35 | 22 |

Table 3 shows that the electrolyte used in the battery of this invention has an increasingly high flash point and the safeness of it is greatly improved. It is possible to lower the danger of flashing by leaking of the electrolyte, and to improve the productivity in the production process.

Example 6

Using a non-aqueous electrolyte prepared by dissolving LiPF$_6$ as the lithium salt in a mixed solvent fluorinated ether and DMC shown in Table 4 (volume ratio: 1:1) as a solvent for non-aqueous electrolyte to 1 mol/liter, the cathode and anode obtained as described above were sandwiched with a separator. The non-aqueous electrolyte and the sandwiched electrodes with a separator were put in a container made of stainless steel to produce batteries B1–B11. The charge/discharge test was conducted according to the same manner as that described in Example 1.

The observed results of the cycle efficiencies and high rate efficiencies are shown in Table 4.

TABLE 4

| Battery | Fluorinated Ether | Initial charge capacity [mAh] | Cycle efficiency | High-rate efficiency | |
|---|---|---|---|---|---|
| | | | | Initial | After cycles |
| B1 | 2,2,3,3-tetrafluoropropyl difluoromethyl ether | 6.1 | 0.89 | 0.60 | 0.68 |
| B2 | 2,2,3,3,3-pentafluoropropyl tetrafluoroethyl ether | 6.4 | 0.88 | 0.53 | 0.47 |
| B3 | 2,2,3,4,4-pentafluorobutyl difluoromethyl ether | 6.7 | 0.81 | 0.52 | 0.55 |
| B4 | 2,2,3,3,3-pentafluoropropyl difluoromethyl ether | 6.4 | 0.92 | 0.64 | 0.84 |
| B5 | 1-trifluoromethyl 2,2,2-trifluoroethyl ether | 7.4 | 0.68 | 0.70 | 0.57 |
| B6 | 1,1,2,2-tetrafluoroethyl ethyl ether | 7.2 | 0.82 | 0.69 | 0.75 |
| B7 | 1,1,2,2-tetrafluoroethyl -2,2,2-trifluoroethyl ether | 6.0 | 0.80 | 0.51 | 0.48 |
| B8 | 2,2,3,3-tetrafluoropropyl methyyl ether | 6.3 | 0.75 | 0.61 | 0.61 |
| B9 | 2,2,3,3,4,4-hexafluorobutyl methyl ether | 7.0 | 0.64 | 0.61 | 0.49 |

Example 7

0.6% by weight of polyethylene carbonate (number average molecular weight 50000, hereinafter referred to as "PEC") in N-methylpyrrolidone and 2.4% by weight of PVdF in N-methylpyrrolidone as the binder were added to 97% by weight of the above silane coupling agent-treated material, followed by sufficient kneading to form a paste.

After the paste was coated on a copper foil having a thickness of 20 μm as the current collector, the foil was dried and pressed to form a sheet, which was cut into small pieces the size of 1.5×2 cm to obatain anodes containing PEC.

Except using the anode obtaind above, and as the non-aqueous electrolyte, the mixed solvent of PFPME/DMC (volume ratio 1:1) or 2,2,3,3-tetrafluoropropyl difluoromethyl ether (hereinafter referred to as "TFPDE")/DMC (volume ratio 1:1), batteries P1 an d P2 were produced, and the charge/discharge tests were conducted according to the same manner as that described in Example 1. The initial discharge capacities were 6.5 mAh and 6.6 mAh, respectively.

Above result shows that the initial capacity is increased by using an anode containing polyethylene carbonate without using EC.

A lithium secondary battery can be obtained which operates within a wide temperature range from −20° to 60° C. and causes little deterioration of the discharge capacity by repeated charging/discharging, and which is particularly superior in high-rate capacity and causes little deterioration of the high-rate capacity due to the cycles.

The lithium secondary battery has a very large industrial value for applications such as portable apparatuses, transports and machine tools which require a large current and a large capacity.

What is claimed is:

1. A non-aqueous electrolyte comprising a non-aqueous mixed solvent and a lithium salt, said non-aqueous mixed solvent comprising:

(a) a halogen-substituted ether compound represented by the general formula (I):

$$R_1-O-R_2 \qquad (I)$$

wherein $R_1$ is an alkyl or halogen-substituted alkyl group having 2 or less carbon atoms and $R_2$ is a halogen-substituted alkyl group having 2 to 10 carbon atoms, and (b) at least one compound which increases the solubility of lithium in said mixed solvent relative to the solubility of lithium in said ether compound alone, wherein said mixed solvent contains the lithium salt in an amount of not less than 0.5 mol/liter.

2. A non-aqueous electrolyte according to claim 1, wherein $R_1$ of the halogen-substituted ether compound in the formula is a methyl group, fluoromethyl group, difluoromethyl group or trifluoromethyl group.

3. A non-aqueous electrolyte according to claim 1, wherein $R_2$ in the formula is a halogen-substituted alkyl group having 3 to 5 carbon atoms.

4. A non-aqueous electrolyte according to claim 1, wherein $R_2$ in the formula is a fluorine-substituted alkyl group having 3 to 5 carbon atoms.

5. A non-aqueous electrolyte according to claim 1, wherein the compound added to the halogen-substituted ether compound is an acyclic carbonate.

6. A non-aqueous electrolyte according to claim 5, wherein the acyclic carbonate is selected from the croup consisting of dimethyl carbonate, diethyl carbonate, ethyl methyl carbonate, methyl propyl carbonate, isopropyl methyl carbonate, ethyl propyl carbonate and isobutyl methyl carbonate.

7. A non-aqueous electrolyte according to claim 5, wherein the acyclic carbonate is selected from the group consisting of dimethyl carbonate and ethyl methyl carbonate.

8. A non-aqueous electrolyte according to claim 5, wherein the acyclic carbonate is dimethyl carbonate.

9. A non-aqueous electrolyte according to claim 1 or 5, wherein the non-aqueous mixed solvent contains a cyclic carbonate.

10. A non-aqueous electrolyte according to claim 9, wherein the content of the cyclic carbonate in the non-aqueous mixed solvent is 50% by volume or less.

11. A non-aqueous electrolyte according to claim 9, wherein the content of the cyclic carbonate in the non-aqueous mixed solvent is 30% by volume or less.

12. A non-aqueous electrolyte according to claim 9, wherein the cyclic carbonate is selected from the group consisting of ethylene carbonate (1,3-dioxolane-2-one), vinylene carbonate (1,3-dioxolane-2-one), propylene carbonate (4-methyl-1,3-dioxolane-2-one), 1,2-butylene carbonate (4-ethyl-1,3-dioxolane-2-one), 2,3-butylene carbonate (4,5-dimethyl-1,3-dioxolane-2-one) and isobutylene carbonate (4,4-dimethyl-1,3-dioxolane-2-one).

13. A non-aqueous electrolyte according to claim 9, wherein the cyclic carbonate is selected from the group consisting of ethylene carbonate (1,3-dioxolane-2-one) and vinylene carbonate.

14. A non-aqueous electrolyte according to claim 9, wherein the cyclic carbonate is ethylene carbonate (1,3-dioxolane-2-one).

15. A lithium secondary battery comprising a cathode that can be doped/undoped with lithium ions, an anode of a lithium metal or alloy or a material that can be doped/undoped with lithium ions, and a non-aqueous electrolyte according to claim 1.

16. A lithium secondary battery according to claim 15, wherein the anode contains an active material comprising carbonaceous materials selected from the croup consisting of natural graphite, artificial graphite and a coke material as a single ingredient or a main ingredient.

17. A lithium secondary battery according to claim 15 or 16, wherein the cathode comprises a lithiated metal dioxide containing at least one transition metal selected from the group consisting of vanadium, manganese, iron, cobalt and nickel.

18. A lithium secondary battery according to claim 15 or 16, wherein the cathode comprises a laminar lithiated metal dioxide containing a lithiated nickel dioxide as a main ingredient.

19. A lithium secondary battery according to claim 18, wherein the anode contains a polymer having a carbonate structure represented by the general formula (II)

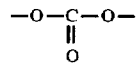

(II)

wherein said polymer has a number average molecular weight of 300 or more.

20. A lithium secondary battery according to claim 17, wherein the anode contains a polymer having a carbonate structure represented by the general formula (II)

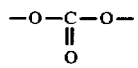

(II)

wherein said polymer has a number average molecular weight of 300 or more.

21. A lithium secondary battery according to claim 16, wherein the anode contains a polymer having a carbonate structure represented by the general formula (II)

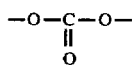

(II)

wherein said polymer has a number average molecular weight of 300 or more.

22. A lithium secondary battery according to claim 15, wherein the anode contains a polymer having a carbonate structure represented by the general formula (II)

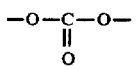

(II)

wherein said polymer has a number average molecular weight of 300 or more.

* * * * *

UNITED STATES PATENT AND TRADEMARK OFFICE
CERTIFICATE OF CORRECTION

PATENT NO. : 5,795,677
DATED : August 18, 1998
INVENTOR(S) : Taketsugu Yamamoto, Hitoshi Miura It is certified that error appears in the above-identified patent and that said Letters Patent is hereby corrected as shown below:

Column 4,
Lines 62-63, please change "vinylene carbonate (1,3-dixolane-2-one)" to
-- vinylene carbonate (1,3-dioxol-2-one) --.

Column 12,
Line 59, please change "croup" to -- group --.

Column 13,
Line 15, please change "vinylene carbonate (1,3-dioxolane-2-one)" to -- vinylene carbonate (1,3-dioxol-2-one) --; and
Line 34, please change "croup" to -- group --.

Signed and Sealed this

Fourteenth Day of August, 2001

Attest:

NICHOLAS P. GODICI
Attesting Officer
Acting Director of the United States Patent and Trademark Office